UNITED STATES PATENT OFFICE

2,368,494
REACTIONS OF TERTIARY OLEFINS WITH ALDEHYDES

Raphael Rosen, Elizabeth, and Erving Arundale, Colonia, N. J., assignors to Standard Oil Development Company, a corporation of Delaware No Drawing. Application December 27, 1940, Serial No. 372,016

20 Claims. (Cl. 260—338)

This invention relates to an improved process for the production of meta-dioxanes, 1,3-butylene glycols, and/or conjugated diolefins by the reaction of tertiary unsaturated compounds of the general formula:

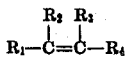

where $R_1$ and $R_2$ are alkyl groups or substituted derivatives thereof and $R_3$ and $R_4$ are alkyl, aryl, aralkyl, alkaryl or alkenyl radicals which may contain substituent groups such as alkoxy, hydroxy, carboxy, acyl, or cyanide groups or hydrogen or halogen atoms, with aldehydes, substituted aldehydes, or compounds capable of yielding aldehydes, in the presence of a catalyst comprising a dilute aqueous solution of boron trifluoride.

Metadioxanes have been prepared previously by reacting such compounds as aldehydes or ketones with 1,3-glycols or other polyhydric alcohols in the presence of an etherification catalyst. This reaction is carried out by heating substantially equal molecular proportions of the reactants at between 100° and 200° C. in the presence of a suitable catalyst. When prepared from glycols and aldehydes, the meta-dioxanes are quite expensive because of the cost of the starting materials. Meta-dioxanes have also been prepared by condensing olefins with aldehydes in the presence of an acid-acting catalyst having an acid concentration of from 25% to 90%, as described in the application of J. J. Ritter, Serial No. 334,668, filed May 11, 1940. Another method for the preparation of meta-dioxanes from primary or secondary olefins through their condensation with aldehydes is described by D. J. Loder in U. S. 2,158,031, issued May 9, 1939, and also in British 483,828 issued April 26, 1938. The process of the present invention is an improvement over previous methods for preparing meta-dioxanes.

The two patents mentioned above claim the condensation of olefins with aldehydes using a boron fluoride-water catalyst in which one mol of boron fluoride is associated with one to five mols of water. Catalysts of this concentration have now been found to be much too potent for the reaction of tertiary unsaturated compounds with aldehydes. The reaction is so rapid as to be uncontrollable and large amounts of wide boiling by-products are obtained under these conditions. We have now discovered that boron fluoride-water catalysts containing at least 9 mols of water per mol of boron fluoride are distinctly advantageous in that they permit complete control of the reaction, eliminate the formation of wide boiling by-products, and even then permit a faster reaction than can be obtained with a dilute mineral acid catalyst of the same concentration on a weight basis. With these olefins, catalysts containing less than 9 mols of water per mol of boron fluoride should be avoided because under such conditions the reaction is explosive in nature. When trimethylethylene is condensed with formaldehyde in the presence of a boron fluoride-water catalyst containing 9.6 mols of water per mol of boron fluoride (28% by weight) at approximately room temperature, the reaction is complete in 15-20 minutes. When the reaction is carried out in the presence of a dilute sulfuric acid catalyst of approximately the same concentration (on a weight basis), 2¼ to 2¾ hours are required to obtain the same yield of meta-dioxane. The above example shows that boron fluoride-water catalysts containing more than 5 mols of water per mol of boron fluoride are extremely active for the olefin-aldehyde condensation reaction.

According to the present invention, tertiary olefins or other unsaturated compounds, or compounds readily converted to the olefins, e. g. alcohol, alkyl chloride, etc., are condensed with aldehydes, thioaldehydes, substituted aldehydes, formals, acetals, or ketones in the presence of an aqueous boron fluoride catalyst in which the ratio of water to boron fluoride is between 9 and 125 mols of water per mol of boron fluoride. The present invention, therefore, contemplates catalysts containing up to but never more than 29.5% boron fluoride on a weight basis. The boron fluoride may also be associated with water and mineral acids, e. g. $H_2SO_4$, HF, HCl, $H_3PO_4$, etc.

The reaction temperature ranges between 10° and 200° C. and the particular temperature employed depends on the olefin or unsaturated compound used, the boron fluoride-water catalyst concentration, and upon the nature of the product desired (meta-dioxane, 1,3-butylene glycol, or conjugated diolefin). A pressure at least equivalent to the vapor pressure of the reaction mixture at the temperature of the reaction should be maintained during the reaction. The reaction pressure will therefore vary from substantially atmospheric pressure to pressures of several atmospheres.

By varying the conditions of temperature, time, and catalyst concentration, meta-dioxanes, 1,3-dihydric alcohols, and/or conjugated diolefins can be produced by this process. If meta-dioxanes are desired, the reactants are preferably employed in the ratio of 2 mols of aldehyde to 1 of the mono-olefin or other unsaturated compound and a catalyst containing between 9 and 25 mols of water per mol of boron fluoride is used at a reaction temperature of 10° to 75° C. Meta-dioxanes are colorless, mobile liquids completely soluble in ether and naphtha and boiling above 110° C. They may be used as solvents, as blending agents for motor fuels, and as intermediates for further chemical synthesis. If 1,3-dihydric alcohols or conjugated diolefins are desired, the reactants should be employed in approximately equal molecular proportions and the reaction should be carried out at a temperature of 75°–200° C. in the presence of a catalyst containing between 25 and 125 mols of water per mol of boron fluoride. The use of large volumes of dilute boron fluoride-water catalyst is preferable if diols or diolefins are desired. The diols boil above 200° C. and are mostly colorless, semi-viscous liquids. They may be used in the production of glyptal resins, in anti-freeze solutions, or in the preparation of conjugated diolefins or other synthetic organic compounds. The conjugated diolefins produced by this process are very useful in the production of synthetic rubbers.

*Reactions*

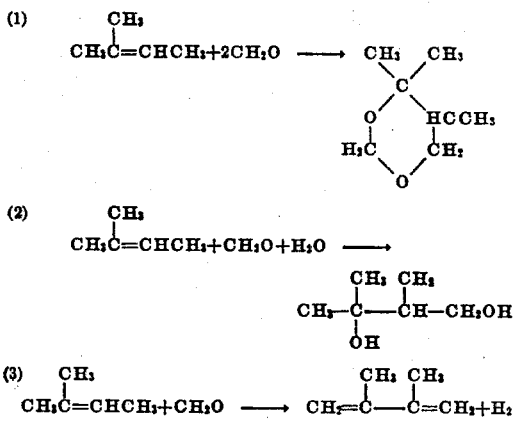

Compounds suitable as starting materials in this process include tertiary olefins, (isobutylene, trimethylethylene, etc.), mixtures of tertiary olefines, mixtures of tertiary olefins and other olefins or paraffins, tertiary alcohols or halides (tertiary butyl alcohol, tertiary amyl alcohol, tertiary amyl chloride, etc.), tertiary unsaturated halides, (methallyl chloride, isocrotyl chloride) tertiary unsaturated ethers (dimethallyl ether), tertiary unsaturated esters (methallyl acetate), tertiary unsaturated alcohols (methallyl alcohol, etc.), tertiary unsaturated ketones (mesityl oxide), tertiary unsaturated nitriles, tertiary unsaturated acids, tertiary diolefins, tertiary olefin polymers, etc.

Aldehydes suitable for use in this process include paraformaldehyde, formalin, other polymers of formaldehyde, acetaldehyde, propionaldehyde, benzaldehyde, methoxy acetaldehyde, or compounds capable of decomposing under the reaction conditions to yield aldehydes, e. g., formals, acetals, hexamethylenetetramine, etc.

The general procedure, according to the present invention, is to charge a pressure vessel with the reactants and catalyst and to agitate the contents of the reactor for a length of time required for completion of the reaction. It is desired to use a pressure vessel equipped with means of agitation in order to insure adequate contact between the reactants and the catalyst. After the reaction is complete, the contents of the vessel are permitted to cool, excess olefin or gaseous products are bled off, and the mixture is then neutralized with an alkali such as sodium carbonate or sodium hydroxide. The neutralized mixture is then steam distilled. The distillate is treated with sodium chloride or a similar salt, the aqueous saline solution is separated from the upper layer, the latter is dried over potassium carbonate or other suitable dessicating salt, the dried liquid is separated from the salt by filtration, and the filtrate is fractionated in order to isolate the pure meta-dioxane and/or conjugated diolefin. The residue from the steam distillation step is cooled and filtered, and the water is removed from the filtrate by vacuum distillation. The vacuum distillation residue is mixed with an anhydrous solvent, such as absolute ethyl alcohol, any inorganic solids are separated from the solution by filtration, and the solvent is removed from the filtrate by vacuum distillation. The residue from the latter distillation comprises the diol formed as a product or by-product in the condensation reaction. It may be purified by vacuum or atmospheric fractionation.

The reaction as carried out in a batch process has been described above. The process may, however, be carried out in a continuous manner (a) by passing a mixture of an olefin, alcohol, or unsaturated compound through a packed reactor concurrent or countercurrent to a boron fluoride-water catalyst if necessary at elevated temperatures; (b) by passing an olefin or other unsaturated compound through a boron fluoride-water-aldehyde solution (if necessary at elevated temperatures and pressures) and removing the products as formed.

The following examples are given for the purpose of illustrating the invention:

*Example 1*

68.7 parts of boron trifluoride were passed into 200.6 parts of water with cooling. 267 parts of the resulting catalyst solution (11/1) were mixed with 240 parts of paraformaldehyde and 338 parts of isobutylene in an autoclave. The mixture was agitated at room temperature but the reaction soon became exothermic and was complete in about 20–25 minutes. The reactor was cooled and the excess isobutylene was bled off. The product was neutralized with sodium hydroxide and steam distilled. The distillate was salted with sodium chloride and the material obtained was dried over anhydrous potassium carbonate and fractionated. 281 parts of 4,4-dimethyl meta-dioxane were obtained boiling between 130 and 132° C. at atmospheric pressure. The steam distillation residue was filtered and the water was removed from the filtrate under vacuum. The residue was extracted with absolute ethyl alcohol, the extract was filtered and the alcohol was removed from the filtrate under vacuum. The glycol residue was then vacuum distilled. 111 parts of 3-methyl 1,3-butanediol were obtained boiling between 93° and 96° C. at 3 mm. pressure.

*Example 2*

42.8 parts of boron trifluoride were passed into 110 parts of water with cooling. The resulting solution (9.65/1) was filtered and the filtrate (weight 138 parts) was added to a reactor containing 120 parts of paraformaldehyde and 243 parts of trimethylethylene. The mixture was contacted for 20–25 minutes during which time the reaction became exothermic. The reactor was then cooled and the contents neutralized with sodium hydroxide. The neutral product consisted of two layers. The lower aqueous layer was drawn off and the upper organic layer was dried over anhydrous potassium carbonate and then fractionated. 160 parts of 4,4,5-trimethyl meta-dioxane were obtained boiling between 150 and 152.5° C. at atmospheric pressure.

Example 3

85.5 parts of boron trifluoride were passed into 219 parts of water with cooling. The resulting catalyst solution (9.66/1) was filtered and 276 parts thereof were mixed with 75 parts of paraformaldehyde and 1055 parts of synthetic C₅ cut containing 14½% of trimethylethylene and 85½% of normal pentane. The mixture was contacted at room temperature for approximately one hour during which time the majority of the formaldehyde reacted. The reaction mixture was then neutralized with sodium hydroxide and the lower aqueous layer was drawn off. The upper layer was dried over anhydrous potassium carbonate, filtered, and then fractionated. 123 parts of 4,4,5-trimethyl meta-dioxane were obtained boiling between 150 and 153½° C. at atmospheric pressure.

Example 4

11.4 parts of boron trifluoride were passed into 215 parts of water. 210.5 parts of the resulting solution (71.2/1) were mixed with 120 parts of paraformaldehyde and 245 parts of trimethylethylene in a copper-lined reactor. The mixture was then agitated at 98–102° C. for approximately 6 hours. The reactor was then cooled and the contents neutralized with sodium hydroxide. The lower aqueous layer was drawn off and the upper organic layer was dried over anhydrous potassium carbonate, filtered, and then fractionated. 50 parts of 2,3-dimethyl 1,3-butadiene were obtained boiling between 64 and 70° C. at atmospheric pressure. The yield of dimethylbutadiene may be improved by the use of a longer contact time. The longer contact time permits the conversion of the by-product, 4,4,5-trimethyl meta-dioxane and 2,3-dimethyl 1,3-butanediol to dimethylbutadiene.

What is claimed is:

1. The process which comprises condensing an aldehyde with a substance selected from the group consisting of tertiary olefins, tertiary alcohols, tertiary halides or tertiary unsaturated halides in the presence of an aqueous boron fluoride catalyst in which the ratio of water to boron fluoride is between 9 and 125 mols of water per mol of boron fluoride, and recovering the products of the reaction.

2. The process which comprises condensing an aldehyde with tertiary olefins in the presence of an aqueous boron fluoride catalyst in which the ratio of water to boron fluoride is between 9 and 125 mols of water per mol of boron fluoride, and recovering the products of the reaction.

3. The process which comprises condensing an aldehyde and a substance selected from the group consisting of tertiary olefins, tertiary alcohols and tertiary halides in the presence of aqueous boron fluoride of between 29.5% and 2.3% concentration by weight, and recovering the products of the reaction.

4. The process which comprises condensing an aldehyde and tertiary olefins in the presence of aqueous boron fluoride of between 29.5% and 2.3% concentration by weight, and recovering the products of the reaction.

5. The process which comprises condensing an aldehyde with tertiary olefins at room temperature under a pressure at least equal to the vapor pressure of the reaction mixture for less than 30 minutes in the presence of an aqueous boron fluoride catalyst in which the ratio of water to boron fluoride is between 9 and 125 mols of water per mol of boron fluoride, and recovering the products of the reaction.

6. The process which comprises condensing formaldehyde with tertiary olefins in the presence of an aqueous boron fluoride catalyst in which the ratio of water to boron fluoride is between 9 and 125 mols of water per mol of boron fluoride, and recovering the products of the reaction.

7. The process which comprises condensing an aldehyde with isobutylene in the presence of an aqueous boron fluoride catalyst in which the ratio of water to boron fluoride is between 9 and 125 mols of water per mol of boron fluoride, and recovering the products of the reaction.

8. The process which comprises condensing an aldehyde with trimethylethylene in the presence of an aqueous boron fluoride catalyst in which the ratio of water to boron fluoride is between 9 and 125 mols of water per mol of boron fluoride, and recovering the products of the reaction.

9. The process which comprises condensing an aldehyde with tertiary olefins in the presence of an aqueous boron fluoride catalyst in which the ratio of water to boron fluoride is between 9 and 12 mols of water per mol of boron fluoride, and recovering the products of the reaction.

10. The process which comprises condensing an aldehyde with isobutylene in the presence of an aqueous boron fluoride catalyst in which the ratio of water to boron fluoride is between 9 and 12 mols of water per mol of boron fluoride, and recovering the products of the reaction.

11. The process which comprises condensing an aldehyde with trimethylethylene in the presence of an aqueous boron fluoride catalyst in which the ratio of water to boron fluoride is between 9 and 12 mols of water per mol of boron fluoride, and recovering the products of the reaction.

12. The process which comprises condensing formaldehyde with isobutylene in the presence of an aqueous boron fluoride catalyst in which the ratio of water to boron fluoride is between 9 and 12 mols of water per mol of boron fluoride, and recovering the products of the reaction.

13. The process which comprises condensing formaldehyde with trimethylethylene in the presence of an aqueous boron fluoride catalyst in which the ratio of water to boron fluoride is between 9 and 12 mols of water per mol of boron fluoride, and recovering the products of the reaction.

14. The process which comprises condensing formaldehyde with tertiary olefins at room temperature under a pressure at least equal to the vapor pressure of the reaction mixture for less than 30 minutes in the presence of an aqueous boron fluoride catalyst in which the ratio of water to boron fluoride is between 9 and 12 mols of water per mol of boron fluoride, and recovering the products of the reaction.

15. The process which comprises condensing formaldehyde with isobutylene at room temperature under a pressure at least equal to the vapor pressure of the reaction mixture for less than 30 minutes in the presence of an aqueous boron fluoride catalyst in which the ratio of water to boron fluoride is between 9 and 12 mols of water per mol of boron fluoride, and recovering the products of the reaction.

16. The process which comprises condensing formaldehyde with trimethylethylene at room temperature under a pressure at least equal to the vapor pressure of the reaction mixture for less than 30 minutes in the presence of an aqueous boron fluoride catalyst in which the ratio of water to boron fluoride is between 9 and 12 mols of water per mol of boron fluoride, and recovering the products of the reaction.

17. The process which comprises condensing formaldehyde with isobutylene in the ratio of 2 mols of formaldehyde per mol of isobutylene at room temperature under a pressure at least equal to the vapor pressure of the reaction mixture for less than 30 minutes in the presence of an aqueous boron fluoride catalyst in which the ratio of water to boron fluoride is between 9 and 12 mols of water per mol of boron fluoride, neutralizing the reaction mass with alkali, steam distilling the neutralized mass, drying the organic portion of the steam distillate, and fractionating the dried material in order to isolate 4,4-dimethyl meta-dioxane.

18. The process which comprises condensing formaldehyde with trimethylethylene in the ratio of 2 mols of formaldehyde per mol of trimethylethylene at room temperature under a pressure at least equal to the vapor pressure of the reaction mixture for less than 30 minutes in the presence of an aqueous boron fluoride catalyst in which the ratio of water to boron fluoride is between 9 and 12 mols of water per mol of boron fluoride, neutralizing the reaction mass with alkali, steam distilling the neutralized mass, drying the organic portion of the steam distillate, and fractionating the dried material in order to isolate 4,4,5-trimethyl meta-dioxane.

19. The process which comprises contacting formaldehyde and isobutylene, at room temperature, under a pressure at least equal to the vapor pressure of the olefins for from 20 to 25 minutes with aqueous boron fluoride in which the ratio of water to boron fluoride is between 9 and 12 mols of water per mol of boron fluoride, neutralizing the reaction mass with alkali, steam distilling the neutralized mass, vacuum distilling the residue from the steam distillation step to remove water, solvent extracting the dried residue with an anhydrous alcohol and removing the alcohol from the extract by vacuum distillation to recover 3-methyl 1,3-butanediol.

20. The process which comprises reacting formaldehyde and trimethylethylene at temperatures between 75° C. and 200° C. under a pressure at least equal to the vapor pressure of the reaction mixture with aqueous boron fluoride in which the ratio of water to boron fluoride is between 25 and 125 mols of water per mol of boron fluoride, neutralizing the reaction mass with alkali, removing the aqueous layer, drying the organic material and subjecting the dried product to fractionation to recover the 2,3-dimethyl butadiene.

RAPHAEL ROSEN.
ERVING ARUNDALE.